United States Patent [19]

Stiller et al.

[11] 4,216,569

[45] Aug. 12, 1980

[54] METHOD FOR INSTALLING A TUBE IN A HEAT EXCHANGER TUBE SHEET

[75] Inventors: Richard L. Stiller, St. Louis County, Mo.; Robert Shaffer, Swissvale, Pa.; Edward H. Smith, Plum Borough, Pa.; Regis R. Vollmer, Trafford, Pa.

[73] Assignee: Westinghouse Electric Corp., Pittsburgh, Pa.

[21] Appl. No.: 965,016

[22] Filed: Nov. 30, 1978

[51] Int. Cl.$^2$ .............................................. B23P 17/00
[52] U.S. Cl. .................................. 29/157.3 C; 29/727
[58] Field of Search ................... 29/157.3 R, 157.3 C, 29/157.4, 726, 727, 263; 113/118 R, 118 C, 1 C

[56] References Cited

U.S. PATENT DOCUMENTS

| | | | |
|---|---|---|---|
| 2,023,738 | 12/1935 | Mason et al. | 29/727 |
| 2,156,538 | 5/1939 | Maynes | 29/727 |
| 3,662,451 | 5/1972 | Wagner | 29/263 |
| 3,824,668 | 7/1974 | Wightman | 29/727 |
| 4,068,372 | 1/1978 | Kamohara et al. | 29/727 |

Primary Examiner—Lowell A. Larson
Attorney, Agent, or Firm—J. W. Keen

[57] ABSTRACT

A method for inserting a tube through a tubesheet aperture and expanding it into contact with the aperture's wall. A tube guide-expander device is assembled in an open end of a tube with a portion of the device protruding from the tube. The guide-expander includes a distally protruding tip portion tapered to diverge in a direction toward the tube so as to facilitate insertion of the guide-expander and engaged tube through apertures in spatially separated tube supports and tubesheet. The guide-expander and tube engaged therewith are axially displaced relative to the tubesheet until the desired relative configuration is obtained. Expansion of the tube results from expanding the assembled tube guide-expander and driving the housing tube in the radial direction against the tubesheet aperture's wall. Such guide-expander expansion obtains from relatively axially displacing two structural components and compressing an interposed, radially expansible structure.

21 Claims, 17 Drawing Figures

METHOD FOR INSTALLING A TUBE IN A HEAT EXCHANGER TUBE SHEET

CROSS REFERENCE TO RELATED APPLICATIONS

The present invention is related to commonly assigned, copending application Ser. No. 951,927 and Ser. No. 955,688, whose respective filing dates are Oct. 16, 1978 and Oct. 30, 1978.

BACKGROUND OF THE INVENTION

1. Field of the Invention

This invention relates to assembling a tube in a tubesheet of a heat exchanger, and more particularly, to guiding the tube through spatially separated tube support and tubesheet apertures and radially expanding the tube into contact with the wall of the receiving tubesheet aperture.

2. Description of the Prior Art

Tube installation through tube support plates and tubesheets of shell and tube heat exchangers has traditionally been accomplished by physically pushing a tube in a first direction through generally aligned apertures in spatially separated tube supports and at least one tubesheet. Tube-to-tubesheet aperture misalignment being compensated for by transversely redirecting the tube's leading end and guiding it through the misaligned aperture(s). Tapered tube guides insertable in the tube's leading end have often been used to facilitate tube pushing by substantially reducing the manual intervention of transversely redirecting the tube's leading end to attain suitable tube-to-tube aperture alignment along the length of the tube. Such tapered tube guides are well known in the art and have, heretofore, been removed from the leading tube end prior to connecting the tube to the tubesheet. The connection process was normally a radial enlargement of the tube, often accomplished with a rolling tool inserted in the open end of the tube and radially expanded therein. An alternative and sometimes more reliable tube-to-tubesheet connection constitutes welding the two together. Prior to such welding, however, a preliminary or "tack" roll has usually been used to temporarily secure the tube in the desired configuration with the tubesheet to ensure the accuracy of a subsequent weldment therebetween.

Utilizing separate processes of tube guide extraction and subsequent tube expansion, although time consuming, was not believed to present a major disadvantage to installing tubes in conventional shell and tube heat exchangers. However, in the case of nuclear steam generators or other shell and tube heat exchangers whose primary or channel head side has been exposed to a hazardous environment such as radioactivity, it is desirable to expedite tube repair or replacement operation within the channel head so as to minimize the workmen's exposure time to the hazardous environment.

Automated tube guide extraction and tube expansion substantially eliminate exposure of workmen to the channel head's hazardous environment. An apparatus for extracting tube guides from tubes frictionally engaged therewith is described in commonly assigned allowed application Ser. No. 898,348, filed Apr. 21, 1978. An apparatus for hydraulically expanding the tubes following guide removal is illustrated in commonly assigned U.S. Pat. No. 4,125,937, filed June 28, 1977. The separate extraction and expansion apparatus were designed to be driven by and mate with a support-positioning device operable within a steam generator's channel head. Such support-positioning device (hereinafter referred to as an $R\theta$ machine) is described in commonly assigned allowed application Ser. No. 888,701, filed Mar. 21, 1978.

When straight tubes are utilized in a heat exchanger, a single $R\theta$ machine can be assembled on the primary side of the tubesheet within the channel head, but when U-tubes are utilized such as is common practice in nuclear steam generators, a separate $R\theta$ machine is preferably installed on both sides of the channel head's separating plate which isolates primary fluid entering the channel head from the fluid after it has traversed the tubes and is exiting the channel head. Use of multiple $R\theta$ machines ensures initial tube guide extraction and tube end expansion of the lesser protruding tube end through the tubesheet. Initial guide extraction from and expansion of the greater protruding tube leg can cause retraction of the shorter protruding tube leg toward the secondary side of the tubesheet. Subsequent guide extraction and expansion of the retracted tube leg necessitates "pulling" the tube leg toward the primary side into proper configuration with the tubesheet. "Pushing" rather than "pulling" the tube leg into proper relative position with the tubesheet was judged easier and more desirable. Protrusion differences between the U-tube legs is inherent due to accumulation of manufacturing and assembly tolerances. Since it is not predictable which leg of the U-tube will protrude further through the tubesheet, two $R\theta$ machines are necessary to efficiently extract the guide and expand the tubes.

Such $R\theta$ machines, when used with the aforementioned copending application's tube guides, extraction apparatus therefor, and tube expander, provide automated, remote extraction of the tube guides and expansion of the tubes as well as minimizing workmen exposure to the radioactive environment of the nuclear steam generators' channel heads. However, since separate apparatus or tools are needed to extract the tube guides from the tubes and then expand those tubes, a tool change on both $R\theta$ machines is called for. Such tool change is most efficiently performed by workmen within the hostile environment of the channel head. It would be desirable to further minimize workmen exposure to the channel head's radioactive environment and increase the speed with which the tube guide extraction and tube expansion is accomplished.

SUMMARY OF THE INVENTION

In general, a method for installing a tube in a heat exchanger, when performed in accordance with the present invention, comprises assembling a tube guide-expander apparatus in a tube's leading end, inserting the guide-expander and attached tube end through a tube sheet aperture, actuating the guide-expander to expand the tube against the aperture's wall, and extracting the guide-expander from the tube. When U-tubes constitute the heat exchanger tubes, guide-expanders are assembled in both ends of the tube and the ends are simultaneously inserted through appropriate apertures in the tubesheet. Actuation of the radially expandable guide-expanders and extraction thereof from the tube's ends must be accomplished sequentially, first on the lesser protruding guide-expander and attached U-tube leg and subsequently on the further protruding guide-expander and attached U-tube leg. Tube guide-expander actuation preferably obtains from relatively axially displacing first and second cooperating compression structures thereof to axially compress a radially expandable member situated therebetween. Assembly of the guide-expander in a tube's leading open end includes initially radially expanding the inserted expandable member into frictional engagement with the tube with a force less than that necessary to radially expand the tube. Such initial radial expansion ensures guide-expander securement in the tube during tube insertion through the tubesheet. An actuator-extractor apparatus utilizes inner and outer sleeve structures to relatively axially displace the tube guide-expander's two compression structures. The outer sleeve structure is axially displaced into engagement with the first compression structure to provide and maintain the desired tube-to-tubesheet configuration during relative axial displacement of the inner sleeve structure releasably coupled to the second compression structure. Such relative axial displacement of the first and second compression structures induces secondary radial expansion of the expandable member and plastic expansion of the engaged tube portion. Axially displacing the inner sleeve structure and linked second guide-expander structure to their position prior to the secondary radial expansion preferably provides radial separation between the expandable member and the plastically expanded tube portion so as to facilitate guide-expander extraction from the tube by subsequently simultaneously axially displacing the sleeve structures and linked guide-expander away from the tubesheet. Uncoupling the guide-expander from the inner sleeve structure and axially displacing a piston structure relative to the inner sleeve structure provides expulsion of the guide-expander from the inner sleeve structure.

BRIEF DESCRIPTION OF THE DRAWINGS

The objects and advantages of this invention will become more apparent from the following detailed description in connection with the accompanying drawings, in which.

DESCRIPTION OF THE PREFERRED EMBODIMENT

Figure 1A:
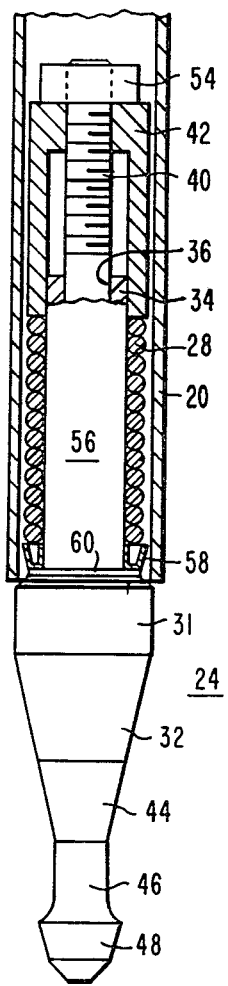
FIGS. 1A and 1B are partial sectional views of a tube guide-expander respectively inserted in and secured against the inner surface of a tube.

Referring now to the drawings in detail, FIG. 1A shows a partial sectional view of a tube 20 with a tube guide-expander 22 inserted in an open end thereof. Tube guide-expander 22 has first and second compression structures 24 and 26 and radial expansion means such as the illustrated elastomeric O-rings 28 axially disposed between portions of both compression structures. First compression structure 24 includes a tube thrust portion 30 which constitutes abutting and tapered components 31 and 32, respectively. Sleeve portion 34 is preferably attached to thrust portion 30 and is insertable within tube 20 so as to provide radially inner support O-rings 28. Opening 36 extends axially through and is radially bounded by sleeve portion 34 and thrust portion 30. The second compression structure 26 includes driving element 38, elongated element 40 and ram element 42. Driving element 38 constitutes a tapered portion 44, a stem portion 46, and a tip portion 48. Elongated element 40 extends through the first compression structure's opening 36 and is connected to the driving and ram elements 38 and 42 respectively on its opposite ends. The outer periphery of tapered portion 44 cooperates with the outer periphery of tapered component 32 in providing a smooth transition surface of decreasing diameter in a direction from the tube thrust portion 30 to stem portion 46. Tip portion 48 preferably includes at least two taper angles 50 and 52 which are, by example, 15 degrees and 45 degrees respectively as measured from the horizontal. Trailing angle 52 is greater than leading angle 50 so as to minimize the material needed in tip portion 48 and improve guidance over a tip portion having only a single taper angle.

Figure 3:
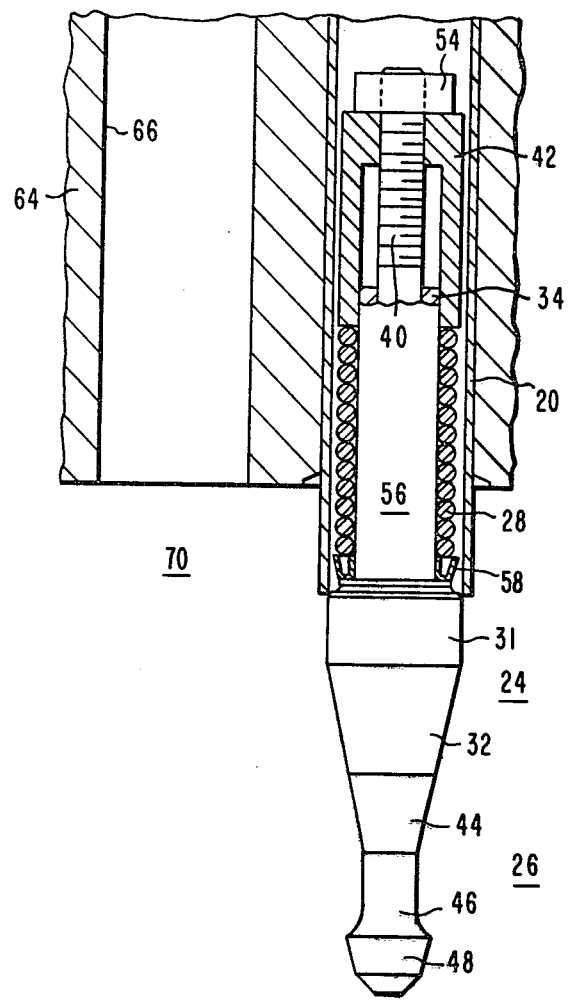
FIG. 3 is a partial sectional view of the guide-expander and attached tube inserted through a heat exchanger tube sheet.

Ram element 42 is preferably disposed in threaded engagement with elongated element 40 so as to be axially displaceable relative thereto when relatively rotated. Frictional axial engagement of ram 42 with O-rings 28 restrains ram rotation during rotation of driving element 38 and connected elongated element 40 and provides such relative axial displacement. Radial expansion means such as O-rings 28 respond to such axial displacement induced compression by radially expanding (as shown in FIG. 3) into contact with tube 20's inside surface. Stopping structure 54 prevents threaded disengagement between ram and elongated elements 42 and 40, respectively, and preferably constitutes a nut in threaded engagement with elongated element 40. A spring pin (not shown) or other device is preferably radially inserted into elongated element 40 and nut 54 to prevent relative rotation therebetween. Transition portion 56 of first compression structure 24 extends radially beyond sleeve portion 34 to form an axially supportive platform 58 for seals 60 which prevent axial flow of elastomeric O-rings 28 therebeyond and optimize their radial expansion during axial compression thereof. The radially outer periphery of transition portion 56 tapers outwardly from the seal support platform 58 to the tube thrust portion 30. The radially outward taper of transition portion 56 constitutes a positioning surface 61 preferably in the configuration of one or more radii and facilitates coaxial assembly of O-rings 28 within tube 20 and axial abutment of thrust portion 30 against the end of tube 20.

Figure 1B:
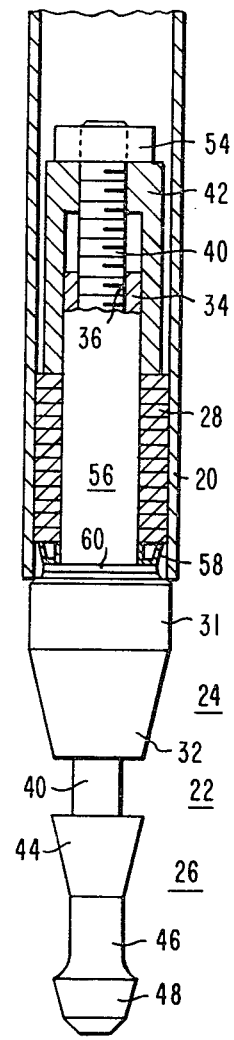

FIG. 1B illustrates tube guide-expander 22 held in engagement with tube 20 by radially expanded O-rings 28. Such engagement obtains from inserting the guide-expander 22 into tube 20 and suitably rotating drive element 38 relative to thrust portion 30. Such relative rotation provides the axial compression and radial expansion of O-rings 28 into engagement with tube 20's inner surface. Such engagement frictionally resists extraction of guide-expander 22 from tube 20 during its subsequent insertion through generally aligned tube support and tube sheet apertures. The radial expansion force of O-rings 28 is adjustable to provide the desired extent of frictional retention of guide-expander 22 within tube 20. Such compression induced expansion force should be less than the force needed to radially expand the tube since such tube expansion would inhibit the tube's insertion through the tube support and tube sheet apertures.

Figure 2:
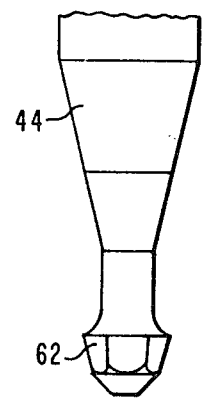
FIG. 2 is a partial sectional view of an alternate embodiment of the preferred guide-expander.

FIG. 2 illustrates an alternate embodiment of the guide-expander 22 disposed in a position analogous to that of FIG. 1A in which the guide-expander 22 has been inserted in tube 20, but is not in securing engagement therewith. The primary difference between the embodiments shown in FIG. 1A and FIG. 2 is that the embodiment of FIG. 2 has planes 62 formed on its tip portion 48 for engagement with a wrench. Such wrench engagement facilitates relatively rotating operationally exposed driving element 38 and tubularly housed ram 42 so as to axially compress and radially expand elastomeric O-rings 28.

FIG. 3 is a partial sectional view of a tubesheet 64 having openings 66 formed therethrough. Tube 20 and associated guide-expander 22 have been inserted through one of the openings 66 from the shell or secondary side 68 to the primary or tube side 70. Tube side 70 is normally at least partially enclosed so as to manifold fluids transmitted thereto and distribute them into the tubes communicating therewith. Such enclosure is normally obtained with a channel head structure (not shown). It is to be understood that tubes 20 may be U-shaped and thus require installation of tube guide-expanders 22 in both tube legs' open ends which must be simultaneously inserted through generally aligned tube support and tube sheet apertures. In the case of U-shaped tubes, the channel head will be partitioned into at least two manifolds—first and second tube leg communicating volumes. Inserting a U-tube and tube guide-expanders 22 installed therein through the tubesheet 64 will result in one of the tube's legs protruding a further and one a lesser distance beyond the primary side 70.

Further axial compression of O-rings 28 beyond their desired frictional retention extent causes further radial expansion thereof and eventual plastic radial expansion of the tube 20 into contact with opening 66. Such axial O-ring 28 compression may result from additional relative rotation of driving element 38 and ram element 42 or relative axial displacement of the first and second compression structures 24 and 26, respectively. Actuation of the guide-expander 22 is accomplished from the tube sheet's primary side 70 which may constitute, as in the case of a nuclear steam generator, a radioactive environment. As such, actuation, manipulation, and extraction of the guide-expander device 22 will preferably be attained through the use of a remotely controlled apparatus such as an actuator-extractor apparatus 72 illustrated in FIGS. 4A and 4B. Relative axial displacement between the device's first and second compression structures was judged more desirable than relative rotation between ram 40 and driving element 38 primarily due to the simpler engagement technique required for axial displacement.

While the remaining illustrations show a single tube and attached guide-expander 22 associated with a single actuating-extractor apparatus, it is to be understood that for U-tube applications, one actuator-extractor apparatus 72 must be operable in each channel head manifold. In other words, for a heat exchanger having a single partition plate (not shown) in the channel head and having U-tubes whose respective legs are associated with the respective manifolds of the channel head, two such actuator-extractor apparatus 72 are required—one on either side of the partition plate. It is to be understood that apparatus 72 is positioned and supported by a tool support apparatus (hereafter referred to as an $R\theta$ machine) as described in commonly-owned allowed patent applications, Ser. No. 888,701 and Ser. No. 896,530, each of which is herein incorporated by reference to the extent that the present invention requires a movable tool support-positioning mechanism. Thus, the number of $R\theta$ machines, as disclosed in the aforementioned applications, is equal to the number of actuator-extractor apparatus 72 which are utilized. Apparatus 72 generally includes an axially displaceable outer sleeve structure 74, for selectively maintaining thrust portion 30 in abutting relationship with the tube 20, an axially displaceable inner sleeve structure 76, and a coupling mechanism for selectively linking driving element 38 to inner sleeve structure 76. Hydraulic cylinder 78 is connected with and provides axial displacement of inner sleeve structure 76.

Figure 4A:
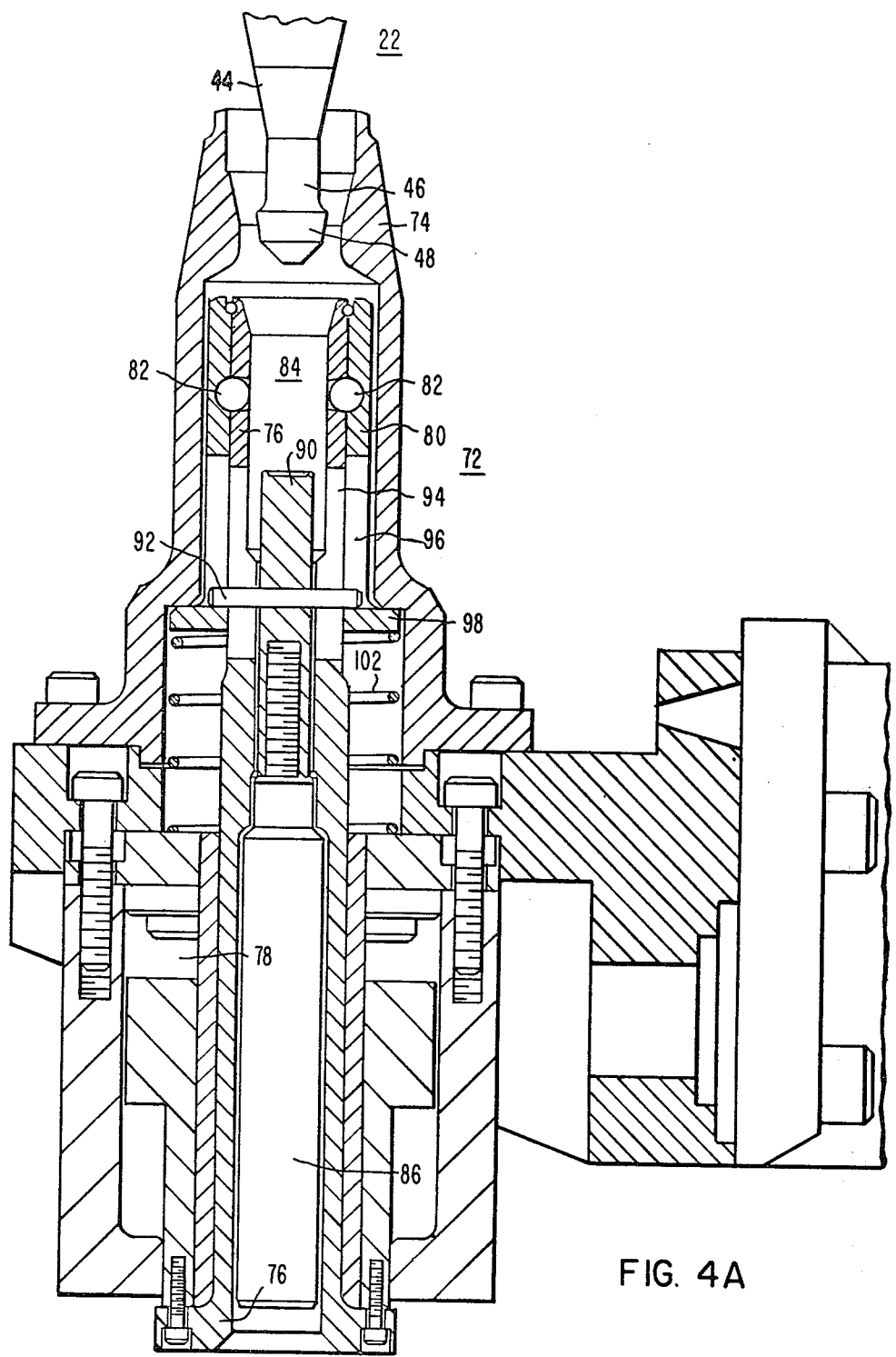
FIGS. 4A and 4B are partial sectional views of an actuating-extraction apparatus illustrating its operative approach configuration for the reception of the tube guide-expander.
Figure 4B:
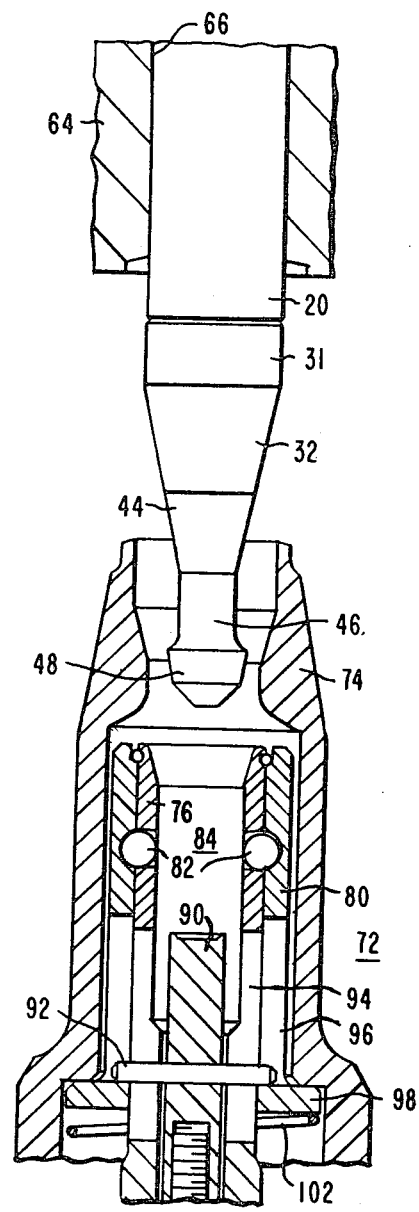

As shown in FIGS. 4A and 4B, apparatus 72 is initially positioned coaxially with guide-expander 22 by an $R\theta$ machine (not shown) prior to being axially displaced toward tubesheet 64. The coupling mechanism includes a plurality (4 by example) of radial openings in inner sleeve structure 76, an equal number of radial openings in an intermediate sleeve structure 80 circumferentially disposed about in closely spaced radial relation with inner sleeve structure 76, and ball detents 82 radially displaceable in the openings. When the radial openings of inner and intermediate sleeve structures 76 and 80, respectively, are aligned, the ball detents 82 will move to a radially outer position as shown in FIGS. 4A and 4B. When situated in the illustrated, unobstructing position, balls 82 permit axial entry of device 22 into bore 84 of inner sleeve structure 76. During axial alignment of the inner and intermediate sleeve structure's radial openings, radial displacement of balls 82 to their unobstructing positions is ensured by providing the inner sleeve structure's radial openings with an axial expanse at the inner sleeve structure 76's outer periphery which is greater than the opening's axial expanse at inner sleeve structure 76's inner surface. The radial openings in intermediate sleeve structure 80 cooperate with inner sleeve structure 76's radial openings when aligned therewith to permit radial displacement of balls 82 such that the radially inner extent of balls 82 is preferably outside the bore 84 of inner sleeve structure 76. To provide axial alignment between the radial openings, axial displacing means such as air cylinder 86 is supported within and moves with inner sleeve structure 76. Air cylinder 86 includes piston structure 88 which is axially displaceable relative to inner sleeve structure 76. Piston structure 88 includes abutting element 90 and radial actuating pin 92 which extends through slots 94 and 96 respectively formed in the inner and intermediate sleeve structures. Axial alignment of the sleeve structures' radial openings is ensured by axially displacing piston structure 88 until alignment collar 98 attached to intermediate sleeve structure 80 engages shoulder 100 attached to outer sleeve structure 74. Pin 92 restrains axial movement of intermediate sleeve structure 80 against biasing spring 102 until collar 98 engages shoulder 100. Axial displacement of piston structure 88 toward guide-expander 22 beyond the position corresponding to engagement between collar 98 and shoulder 100 will be described later in conjunction with ejection of guide-expander 22 from apparatus 72.

Figure 5:
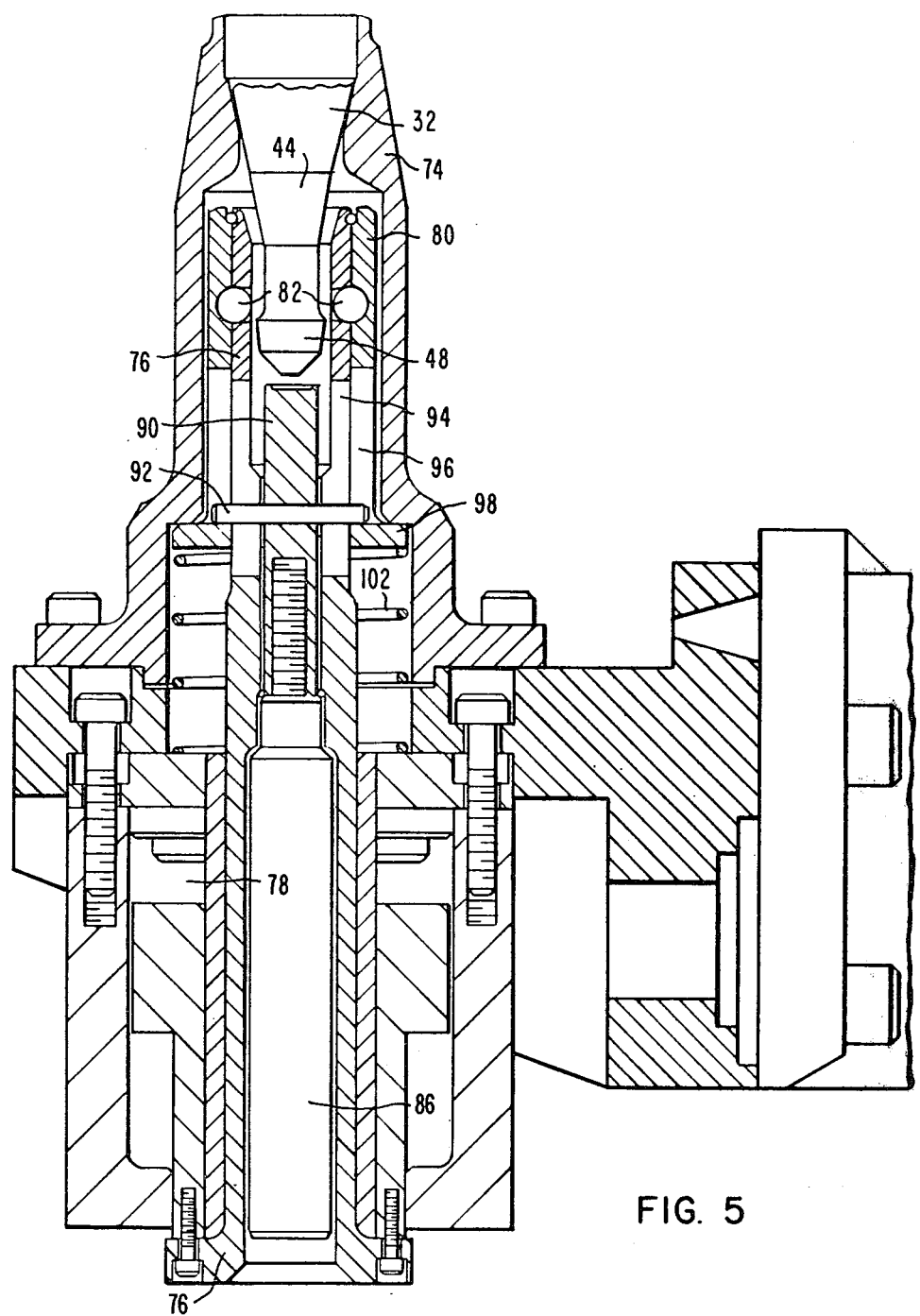
FIGS. 5, 6, 7A, 7B, 7C, 8A, 8B, 9, 10A, 10B, and 11 are partial sectional views of the guide-expander and actuating-extraction apparatus therefor sequentially illustrating the actuation, expansion, and extraction of the guide-expander.

FIG. 5 illustrates initial contact of outer sleeve structure 74 with the tapered component 32 of thrust portion 30. When inner sleeve structure 76 is in its illustrated furthest extended position and balls 82 are in their unobstructing, uncoupled configuration, outer sleeve structure 74 will engage guide expander 22's tapered component 32 shortly after tip portion 48 thereof passes into bore 84 axially beyond the aligned radial openings and their associated balls 82. Additional displacement of apparatus 72 toward tubesheet 64 by the Rθ machine provides simultaneous axial displacement of the guide-expander 22 and engaged tube 20. The desired configuration between tube 20 and tubesheet 64 is provided by terminating axial displacement of apparatus 72 upon its engagement with tubesheet 64.

Such engagement between apparatus 72 and tube sheet 64 preferably occurs when outer sleeve structure 74 axially abuts the boundary of counter bore 104 previously formed on primary side 70 of tubesheet 64 about each opening 66 therein. Counter bore 104 is shown by way of example and is not a required surface preparation for the utilization of disclosed apparatus 22 and 72. Since the tube 20 is in a known, abutting configuration with thrust portion 30 of guide-expander 22, since guide-expander 22 is in a known, abutting configuration with actuator-extractor apparatus 72, since actuator-extractor apparatus 72 is in a known, abutting configuration with tubesheet 64, tube 20 can be considered to be in the desired configuration with tubesheet 64. Appropriate alteration of any or all the aforementioned parts and apparatus can be provided to obtain the desired tube-to-tube sheet configuration such as shortening outer sleeve structure 74 in the absence of counter bore 104.

Figure 6:
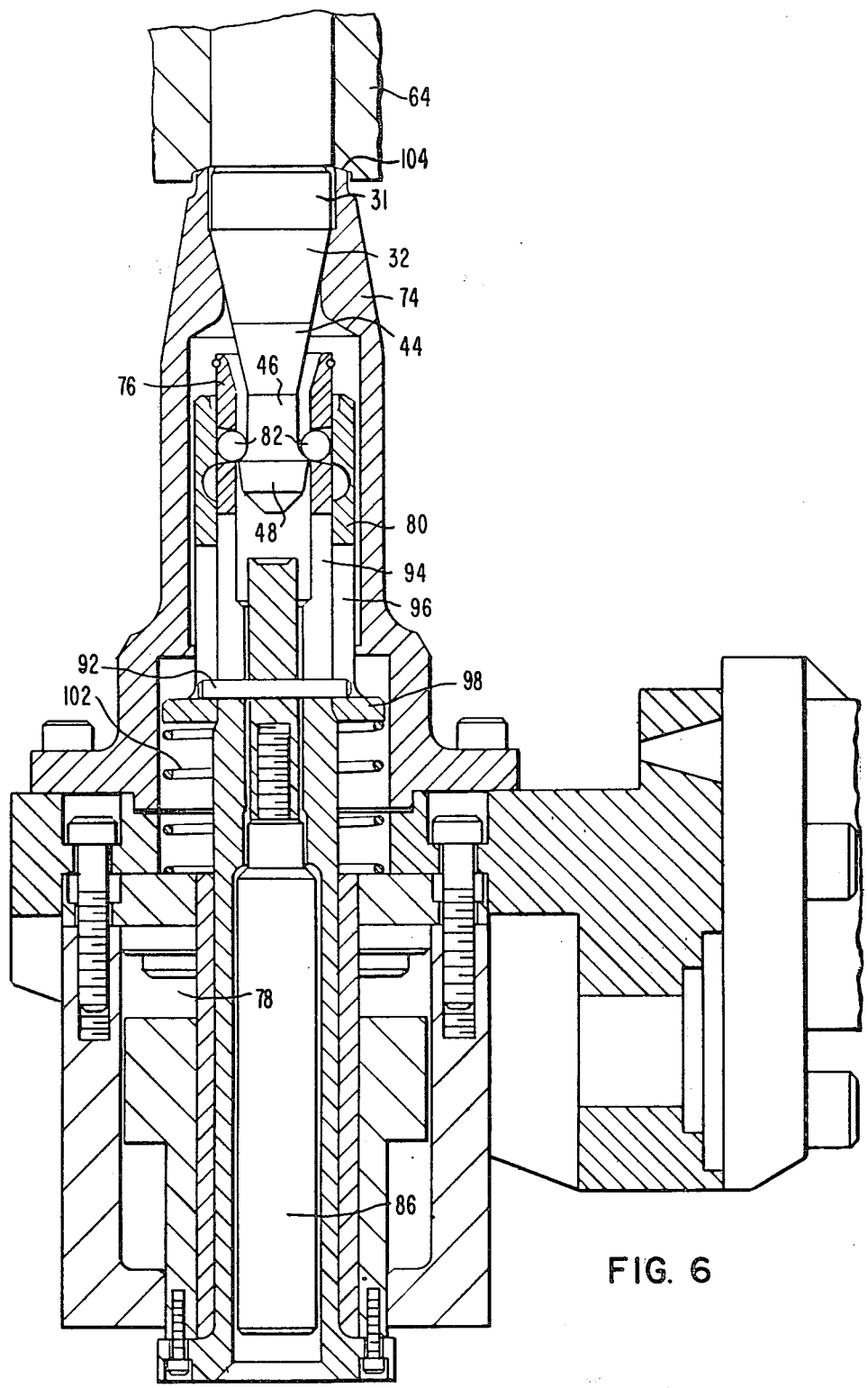

FIG. 6 illustrates apparatus 72 engaged with guide-expander 22 and tubesheet 64. Intermediate sleeve structure 80 has been axially retracted from tubesheet 64 causing radial displacement of balls 82 into their radially inner, obstructing relation with tip portion 48 of driving element 38 to prevent withdrawal thereof from bore 84. Intermediate sleeve structure 80 is retractable by axial displacement of radial actuating pin 92 which axially engages the lower end of slot 96 and thus disengages collars 98 from shoulder 100 and misaligns the radial openings in intermediate sleeve structure 80 from those of inner sleeve structure 76 against the biasing force of spring 102.

Figure 7A:
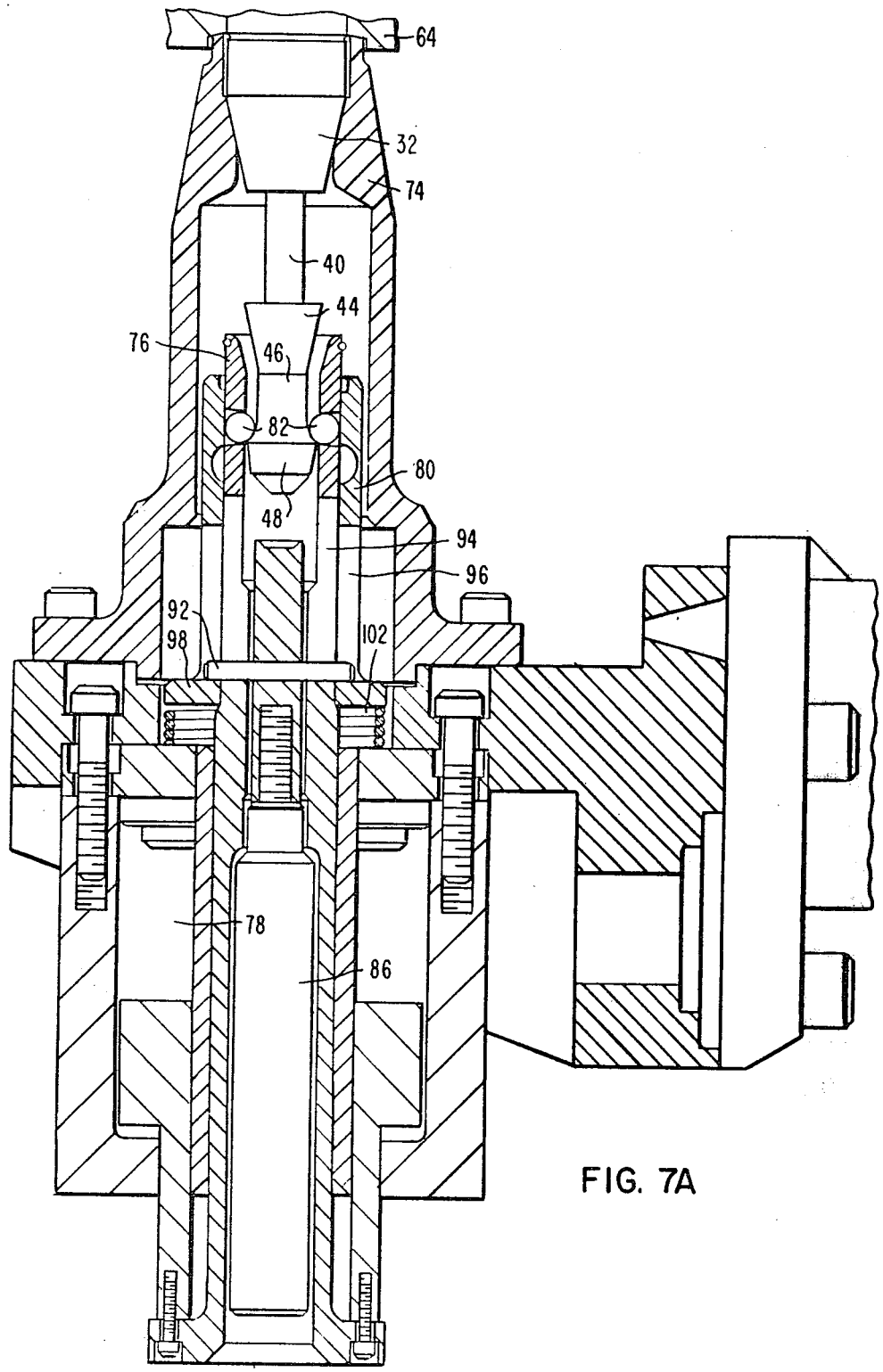
Figure 7B:
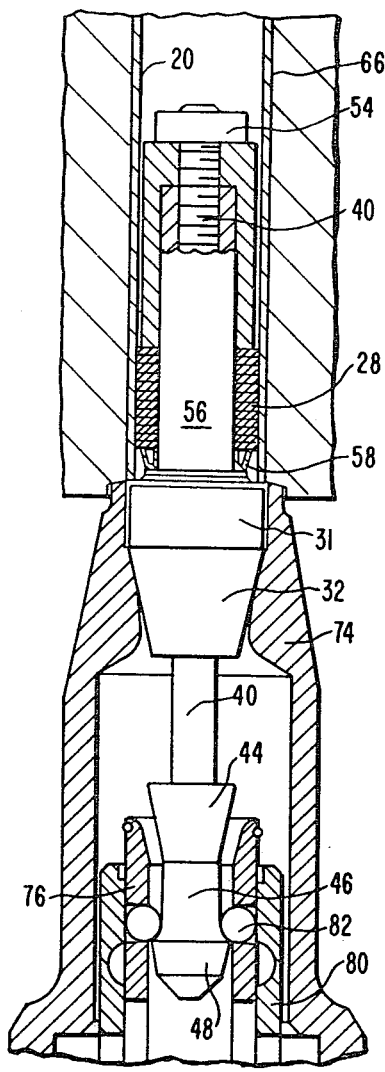
Figure 7C:
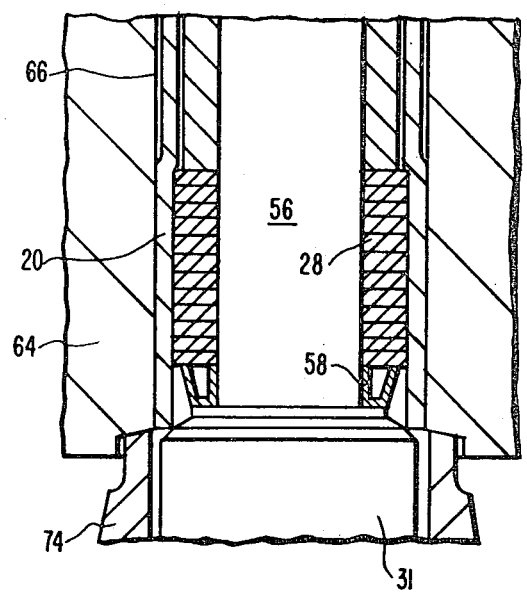

FIGS. 7A through 7C are partial sectional views of the actuator-extractor apparatus 72 in actuating engagement with guide-expander 22. FIG. 7A illustrates hydraulic cylinder 78 and connected inner sleeve structure 76 in their retracted positions in which driving element 38 and attached elongated element 40 are axially displaced relative to the first compression structure 24. When hydraulic cylinder 78 is retracted, balls 82 prevent withdrawal of driving element 38 from bore 84. Intermediate sleeve structure 80 is simultaneously axially retracted with the inner sleeve structure 76 by radial actuating pin(s) 92 which links the supported air cylinder 86 with intermediate sleeve structure 80. Spring 102 is axially compressed by the retraction of the intermediate sleeve structure 80 away from tubesheet 64. FIGS. 7B and 7C are partial sectional views of guide-expander 22's engagement with actuator-expander 72 and the radially expansible O-rings 28 in engagement with expanded tube 20, respectively. As can be seen in FIG. 7C, O-rings 28 have been axially compressed beyond their securing configuration of FIG. 1A and respond thereto by radially plastically expanding tube 20 against the wall of aperture 66.

Figure 8A:
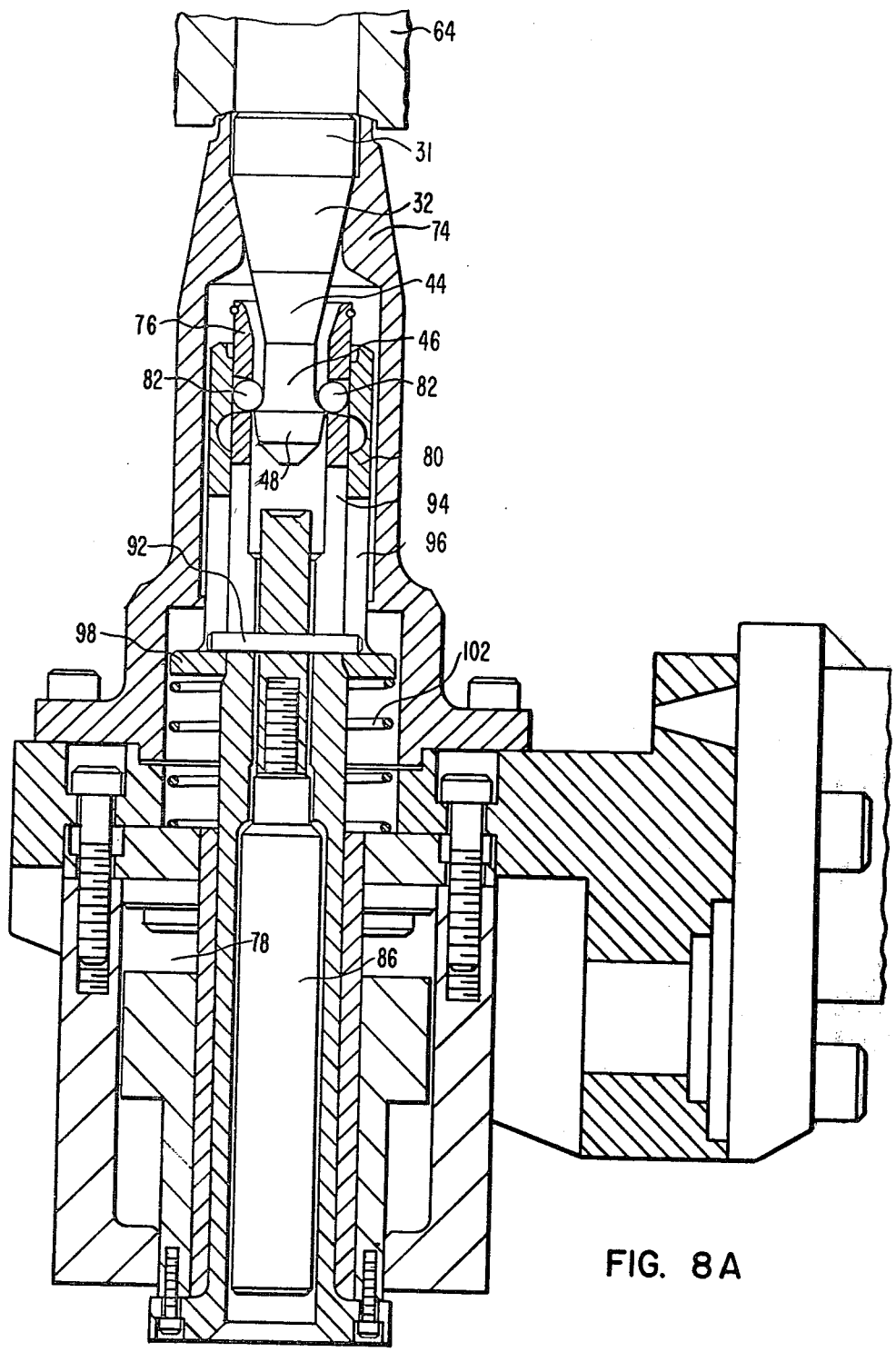
Figure 8B:
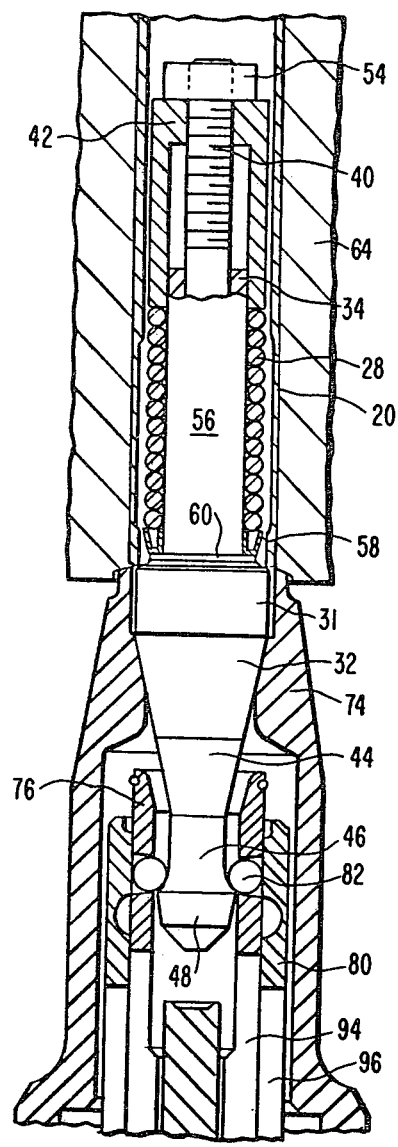

FIG. 8A is a partial sectional view of apparatus 22 and apparatus 72 illustrating a relative configuration therebetween identical to that of FIG. 6. FIG. 8A's configuration obtains from reversing the axial retraction of the inner and intermediate sleeve structures 76 and 80, respectively. All elements of apparatus 22 and 72 shown in FIG. 8A occupy the same relative configurations as do the elements illustrated in FIG. 6 with the only difference being tube 20's plastic expansion against aperture wall 66 as shown in FIG. 8B. FIG. 8B illustrates driving element 38 again in axially abutting relationship with tapered component 32 of guide-expander 22. As can be seen in FIG. 8B, O-rings 28 have again contracted to their radial securing size shown in FIGS. 1A and 3 through 6 and are now radially separated from the heretofore plastically expanded tube portion shown in FIGS. 7B and 7C.

Figure 9:
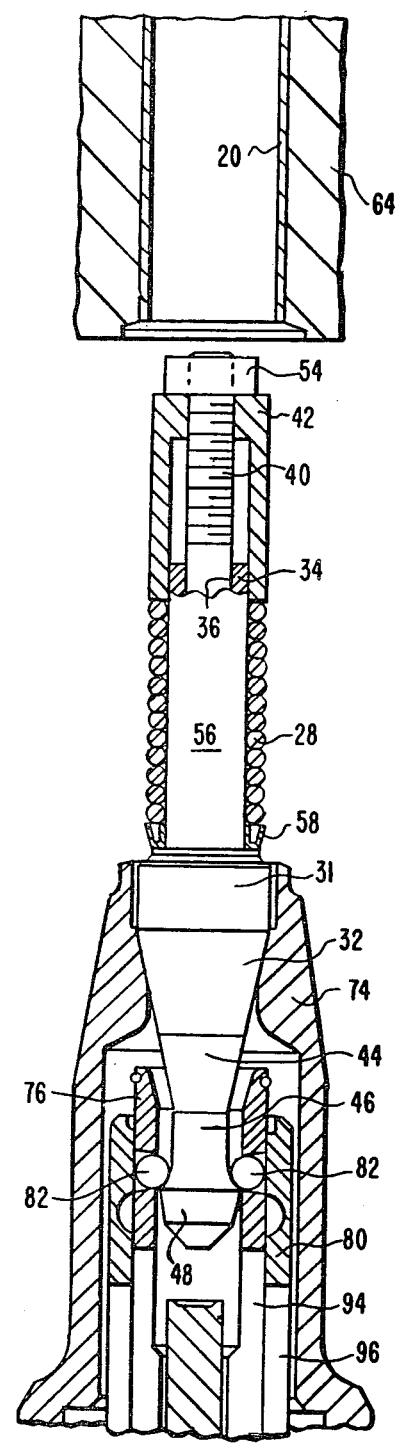

FIG. 9 is a partial sectional view of a portion of apparatus 72 and guide-expander 22 in a withdrawn position from expanded tube 20. Following this configuration of FIGS. 8A and 8B, the entire apparatus 72 is retracted from tubesheet 64 by the supporting Rθ machine with balls 82 remaining radially disposed in their inner, obstructing position. Since outer sleeve structure 74 is retracted with the inner sleeve structure 76, O-rings 28 are not radially expanded against the wall of tube 20 and the coupled guide-expander 22 is easily withdrawn from tube 20.

Figure 10A:
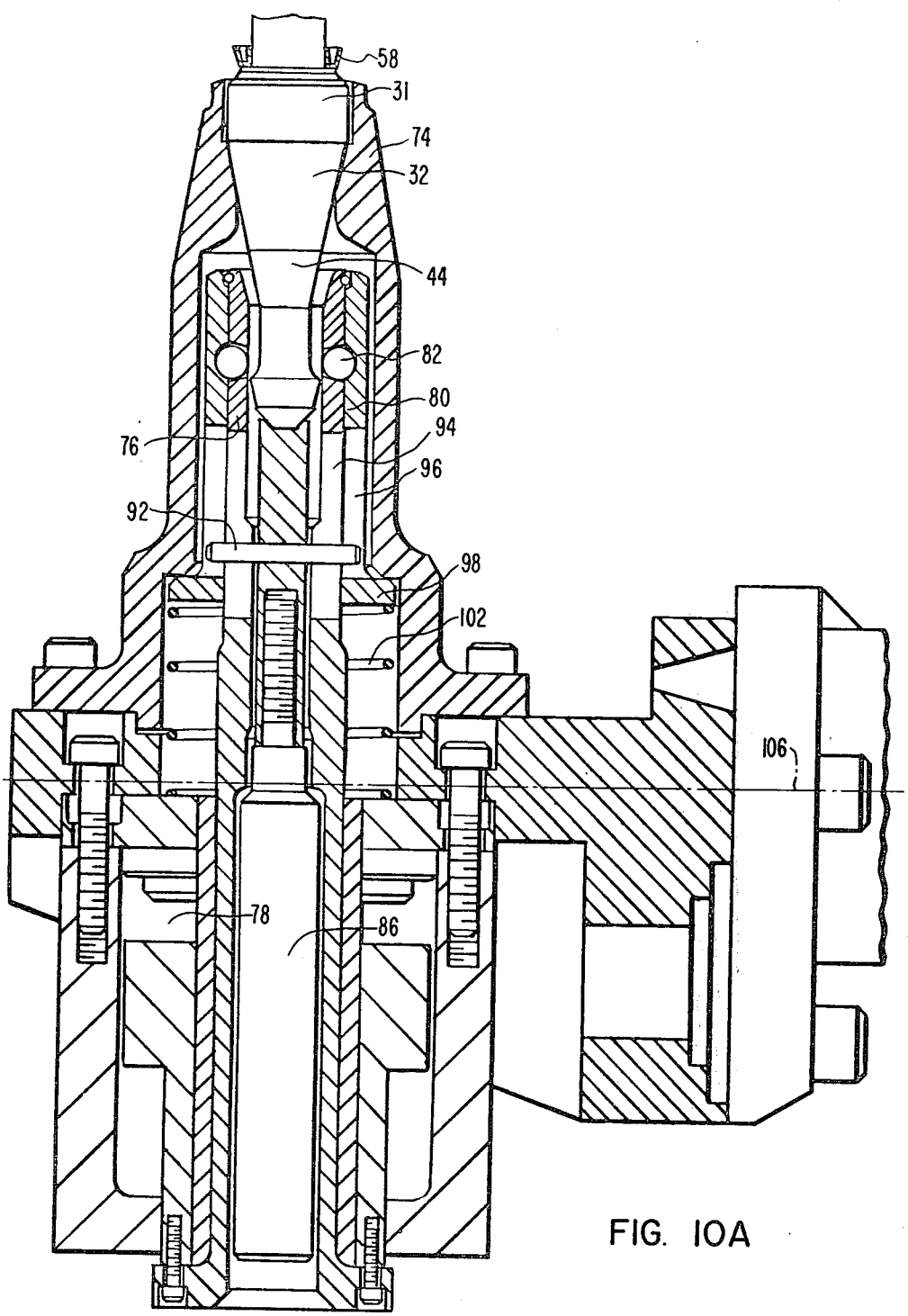
Figure 10B:
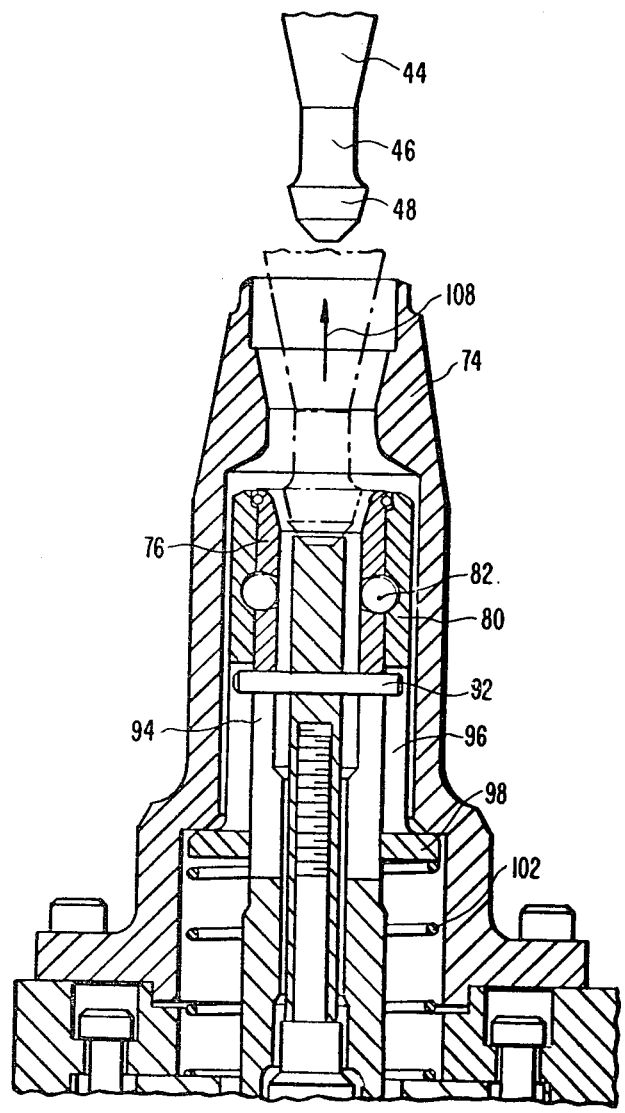
Figure 11:
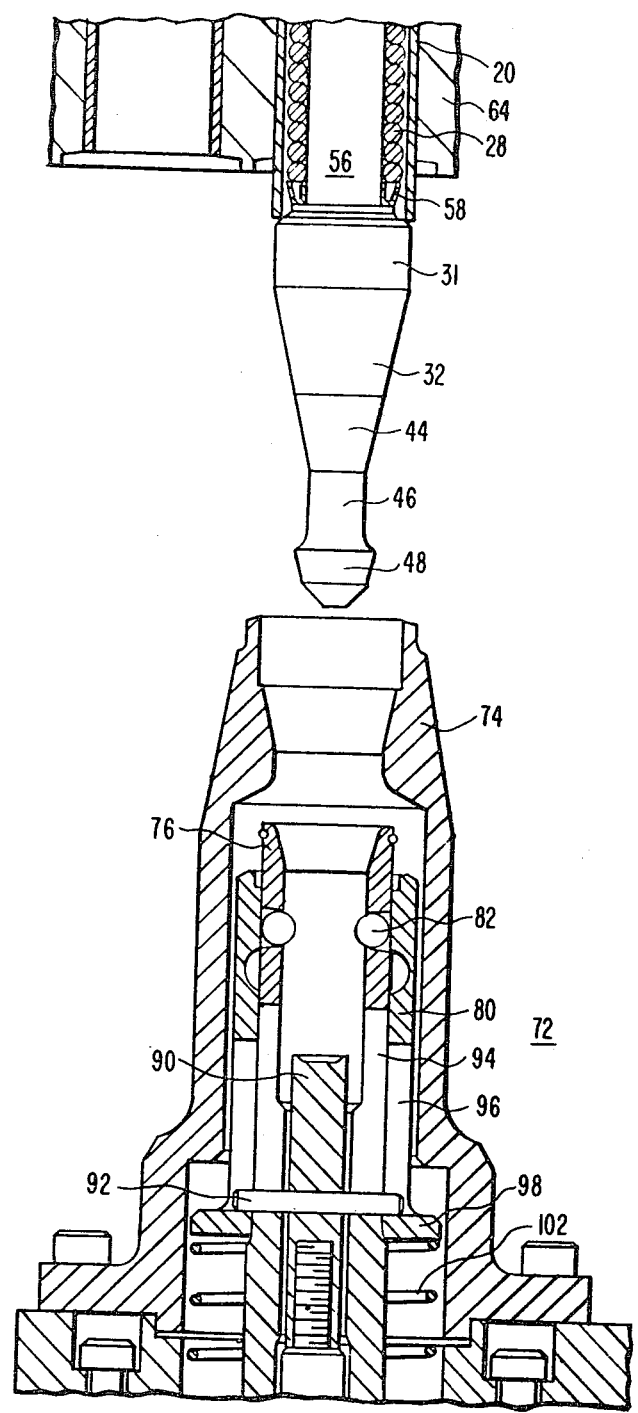

FIGS. 10A and 10B are partial sectional views illustrating the expulsion of guide-expander 22 from actuator-extractor apparatus 72. Upon axial retraction of apparatus 72 and 22 a suitable distance from the tubesheet 64 and other protruding guide-expander apparatus 22, apparatus 72 is preferably rotated at least 90° about axis 106 which is perpendicular to bore 84. Air cylinder 86 axially displaces piston structure 88 toward guide-expander 22. When collar 98 axially engages shoulder 100, the radial openings of the inner and intermediate sleeve structures 76 and 80, respectively, axially align and permit radial displacement of balls 82 to their unobstructing position. Further displacement of piston structure 88 sequentially results in axial abutment of abutting structure 90 with apparatus 22's tip portion 48 as illustrated in FIG. 10A and axial engagement between actuating pin 92 and the extreme boundary of slot 94. Engagement between pin 92 and the boundary of slot 94 ensures axial expulsion of guide expander 22 in the direction shown by arrow 108 in FIG. 10B. Following such expulsion, apparatus 72 is reversibly rotated to its extracting position about axis 106 and locked securely therein. The apparatus 72 is then indexed coaxially with another guide-expander 22 so as to assume the configuration shown in FIG. 11 in which collar 98 is engaged with shoulder 100 and balls 82 occupy their radially outer, unobstructing position in preparation for receiving the apparatus 22's driving portion 38 into bore 84.

When tubes 20 have U-shapes, two Rθ machines and associated actuator-extractor apparatus 72 are preferably disposed adjacent corresponding legs of the same U-tube. Only one leg of the U-tube should be swaged and properly configured relative to the tubesheet 64 at one time since the legs of a U-tube will not protrude through tubesheet 64 on the primary side 70 precisely the same distance. Since it is easier to push a tube leg 20 into proper configuration with tubesheet 64 from the primary side 70, the shorter protruding tube leg 20 of the U-tube is chosen after measurement thereof for proceeding with sequential steps as indicated at FIGS.

4A through 10B. Selection of the shorter protruding tube leg of the U-tube prevents that leg and attached guide-expander 22 from being withdrawn into its aperture 66 when the longer protruding tube leg is axially displaced into the desired configuration with tubesheet 64 as indicated in FIG. 6. After the shorter protruding tube leg has been properly configured and expanded, the longer protruding tube leg can be properly configured and expanded without fear of the aforementioned tube leg withdrawal. Although only one tube end has been described, it is to be understood that U-tubes have two ends which each appear the same as the described end. Subscribing to the aforementioned procedure for installing U-tubes necessitates sequential reference to the same Figures showing a single tube end.

It will now be apparent that a multi-duty tube guide-expander has been provided in which axial compression is utilized to produce radial expansion of a housing tube 20 into contact with the wall bounding a tube sheet aperture 66. Actuation of the guide-expander apparatus 22 and extraction thereof is facilitated by apparatus 72 which is engageable with the guide-expander 22 and can relatively axially displace at least two portions of the guide-expander 22 so as to radially expand it. Following actuation of the guide-expander apparatus 22, the extractor apparatus 22 extracts the guide-expander apparatus from the plastically expanded tube and expels it preparatory to its subsequent collection and removal. The actuator-extraction apparatus 72 can then be indexed to another guide-expander apparatus 22. While the guide-expander and actuator-extractor apparatus have been described in conjunction with vertically disposed tubes of a nuclear steam generator, it is to be understood that the aforementioned apparatus and method for utilizing the same equally facilitates tube installation in conventional, non-nuclear heat exchangers whose tubes are horizontally configured. Rθ machines as previously described provide the necessary support and manipulation of the actuator-extractor apparatus 72 and enable its indexation under suitable guide-expanders 22 protruding through tube sheet 64. Cooperative use of such apparatus permits multiple operations with a single tool, thus eliminating the need for tool changes, workmen interference, and/or exposure of the workmen to the environment surrounding the tube's primary side 70.

We claim:

1. A method for installing a tube in a heat exchanger tubesheet, said method comprising:
   assembling a first guide-expander in an open end of a tube;
   inserting the tube and said first guide-expander assembled therein through a tubesheet aperture from a secondary to a primary side;
   radially expanding said guide-expander so as to radially enlarge the tube into contact with the tubesheet aperture's wall; and
   extracting said guide-expander from the enlarged tube.

2. The method of claim 1 wherein said tube has a U-shaped configuration, said assembling step further comprising:
   assembling a second tube guide-expander in the tube's other open end.

3. The method of claim 2, said inserting step further comprising:
   inserting said second guide-expander and attached tube end through a second tubesheet aperture.

4. The method of claim 3 further comprising:
   measuring said tube ends' protrusions beyond said tubesheet's primary side and selecting the lesser protruding tube end for initial radial expansion and extraction of its assembled guide-expander.

5. The method of claim 4 further comprising:
   secondarily radially expanding the guide-expander assembled with the greater protruding tube end subsequent to the initial radial expansion and extraction; and
   extracting the guide-expander assembled with the greater protruding tube end subsequent to said secondary radial expansion.

6. The method of claim 1, said assembling comprising:
   inserting a sleeve portion of a first compression structure of the tube guide-expander into the tube's end, said sleeve portion having an opening therethrough;
   abutting a thrust portion of the first compression structure against the axial end of the tube, said thrust portion having an opening therethrough;
   inserting a ram element of a second compression structure of the tube guide-expander into the tube's end, said ram element being radially larger than an elongated element attached thereto which extends through said opening;
   mounting radial expansion means axially between said ram element and thrust portion, said radial expansion means being radially expandable in response to axial compression thereof; and
   abutting a driving element of the second compression structure against the thrust portion, said driving element being attached to said elongated element.

7. The method of claim 6 further comprising:
   axially displacing at least one of the elements attached to said elongated element relative to the elongated element to frictionally engage the tube's interior surface and prevent disassembly of the guide-expander from the tube during the insertion of both through the tubesheet.

8. The method of claim 7, said elements' relative axial displacement comprising:
   relatively rotating the ram and elongated elements which are threadably engaged.

9. The method of claim 1, said guide-expander expansion comprising:
   axially displacing a second compression structure of said guide-expander relative to a first compression structure of said guide-expander to axially compress and radially expand radial expansion means disposed therebetween.

10. The method of claim 9, said relative axial displacement of said first and second compression structures comprising:
    securing a thrust portion of said first compression structure in axial abutment with the tube's end;
    grasping a driving element of said second compression structure, said driving element being adjacent said thrust portion; and
    retracting said driving element away from the thrust portion.

11. The method of claim 10, said thrust portion securement comprising:
    displacing an outer sleeve structure axially towards the tubesheet for axial abutment with the thrust portion and tubesheet.

12. The method of claim 10, said grasping comprising:
  displacing an inner sleeve structure axially towards said tubesheet to receive said driving element in its bore; and
  coupling the driving element to said inner sleeve structure.

13. The method of claim 12, said coupling comprising:
  displacing a plurality of balls radially inwardly through radial openings in said inner sleeve structure.

14. The method of claim 13, said ball radial displacement comprising:
  axially displacing an intermediate sleeve structure having radial openings therein to a position where said inner and intermediate sleeve structures' openings are misaligned.

15. The method of claim 12, said driving element retraction comprising:
  axially displacing the inner sleeve structure coupled to the driving element axially away from the tubesheet for a predetermined distance.

16. The method of claim 10 further comprising:
  axially displacing the driving element toward the thrust portion so as to allow contraction of said radial expansion means after driving element retraction.

17. The method of claim 1, said guide-expander extraction comprising:
  displacing a thrust portion of said guide-expander axially away from said tubesheet; and
  displacing a driving element of said guide-expander axially away from said tubesheet.

18. The method of claim 17, said driving element displacement comprising:
  displacing an inner sleeve structure coupled to said driving element axially away from said tubesheet.

19. The method of claim 18, said thrust portion displacement comprising:
  displacing an outer sleeve structure disposed about said inner sleeve structure axially away from said tubesheet to allow simultaneous axial displacement of said driving element and thrust portion.

20. The method of claim 18 further comprising:
  uncoupling said inner sleeve structure from said driving element; and
  axially displacing an ejector disposed in said inner sleeve structure's bore to expel said guide-expander therefrom.

21. The method of claim 20 further comprising:
  rotating said inner sleeve structure through a predetermined arc about an axis perpendicular to its longitudinal axis.

* * * * *